United States Patent [19]

Alfter et al.

[11] 4,288,490
[45] Sep. 8, 1981

[54] ENGINE HOOD LINING FOR AUTOMOTIVE VEHICLES

[75] Inventors: Franz-Werner Alfter, Sieburg; Hans-Ulrich Breitscheidel, Troisdorf, both of Fed. Rep. of Germany

[73] Assignee: Dynamit Nobel Aktiengesellschaft, Troisdorf, Fed. Rep. of Germany

[21] Appl. No.: 667,453

[22] Filed: Mar. 16, 1976

[30] Foreign Application Priority Data

Mar. 27, 1975 [DE] Fed. Rep. of Germany ....... 2513705

[51] Int. Cl.³ .......................... B32B 5/18; E04B 1/74
[52] U.S. Cl. ................................ 428/315; 296/39 A; 428/159; 428/172
[58] Field of Search ................. 260/2.5 HA; 428/315, 428/320, 172, 321, 322, 69, 71, 158, 159; 296/31 R, 31 P, 39 R, 39 A; 264/321

[56] References Cited

U.S. PATENT DOCUMENTS

| 3,065,190 | 11/1962 | Chisholm et al. | 260/2.5 HA |
| 3,391,823 | 7/1968 | Tijms | 428/315 |
| 3,455,483 | 7/1969 | Inklaar | 428/322 |
| 3,503,841 | 3/1970 | Sterrett | 428/303 |
| 3,607,603 | 9/1971 | Coverdale, Jr. | 428/315 |
| 3,608,006 | 9/1971 | Hosoda et al. | 260/2.5 HA |
| 3,619,343 | 11/1971 | Freeman | 260/2.5 HA |
| 3,651,183 | 3/1972 | Hosoda et al. | 260/2.5 HA |
| 3,829,150 | 8/1974 | Moore | 296/39 A |
| 3,936,565 | 2/1976 | Good | 428/315 |

Primary Examiner—William J. Van Balen
Attorney, Agent, or Firm—Craig and Antonelli

[57] ABSTRACT

An engine hood lining for automotive vehicles has a continuous sheet-like body that is formed of a closed-cell polyethylene foam material and is shaped to fit the inside contour of a hood of the vehicle.

1 Claim, 3 Drawing Figures

ENGINE HOOD LINING FOR AUTOMOTIVE VEHICLES

For reasons of sound insulation and for the mechanical protection of the engine hood on the inside facing the engine, the engine hoods of automotive vehicles are frequently provided with a lining, which depending on the vehicle type is either made in the form of individual sections by applying the lining sections between the reinforcing seams or corrugations on the inside of the hood, or made in the form of a continuous sheet. Primarily used lining materials are bitumen-impregnated fibrous mats or sealed sheets of polyurethane foams or such sheets welded into polyolefin films. These lining materials are attached within the engine hood by means of adhesives, by means of screws, and also alternatively by means of clips additionally mounted in the engine hood. The heretofore used linings, however, possess considerable disadvantages since these linings can be adapted to the contours of the engine hood only with considerable expenditure, such as with the use of foam-in-place methods, for example. Moreover, several of the heretofore used materials, especially the polyurethane foams welded within films, tend to absorb considerable amounts of water when the film is damaged, whereby there is not only produced an impairment of the desired effect, but the adhesive bond is also detached. At least the aging resistance of the heretofore employed materials is extraordinarily unsatisfactory.

It has now been found that an engine hood lining for automotive vehicles provides special advantages if it is manufactured of an optionally laminated, closed-cell polyethylene foam material. This engine hood lining is preferably made of a closed-cell polyethylene foam material laminated on one side or on both sides with a non-foamed polymer film, preferably a filler-containing heavyweight film or sheet. As the polyethylene foam material, which can also be cross-linked, a material is suitably employed having a weight per unit volume in the range of between 30 and 100 kg./m$^3$. In some cases, a polyethylene foam composite, one side of which contains predominantly high-pressure polyethylene and the other side of which contains primarily low-pressure polyethylene offers special advantages.

The shaping of the engine hood lining can be effected according to conventional processes by molding the polyethylene foam material, which can also be uniformly dyed and thus adapted to the color of the automobile, in the elastic or plastic condition under vacuum or excess pressure, or by compression.

The special advantages of the novel engine hood lining reside, above all, in that the polyethylene foam material utilized in this connection represents a material having very satisfactory hot moldability, making it possible to shape a lining conforming to the contours of the engine hood by means of simple tools, simultaneously directly molding the undercut sections for the mounting of the lining. This not only greatly facilitates the mounting of the lining, but at the same time also ensures the secure attachment thereof to the inside of the engine hood. Since a closed-cell foam material is being used, the absorption of water as well as oil or gasoline is impossible. Simultaneously also the aging resistance of the foam materials employed is better than those of the heretofore utilized materials, especially inasmuch as even by the unavoidable damaging of the engine hood lining, its lifetime is not impaired. When using a heavyweight film or sheet as a laminate with the foam, such as, e.g. a film having a high filler content of heavy spar, i.e. barium sulfate in from 50 to 90% by weight and consisting of an ethylene-vinyl acetate copolymer, generally an even further improved noise attenuation can be attained.

The drawing shows an engine hood lining in accordance with the invention as an example.

Figure 1:
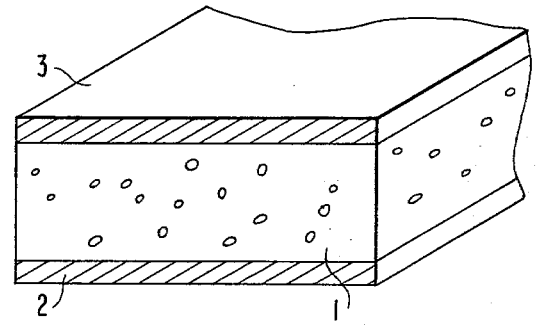
FIG. 1 shows schematically the structure of the material of a lining in an enlarged cross-sectional view.

FIG. 1 shows schematically in an enlarged cross-sectional view the structure of the material in an exemplary embodiment for an engine hood lining, namely a closed-cell polyethylene foam panel 1 flame-laminated on both sides with a non-foamed polymer (i.e. polyethylenevinyl acetate copolymer sheet 2,3 of a smaller thickness, e.g. from 1 to 4 mm., that is, ¼ to 1/15 the thickness of the foam panel). The panel may be from 15 to 20 mm. thick. This material has a very good hot-moldability and thus offers the possibility of being adapted to the contours of the engine hood by molding. Such linings can be manufactured with the use of simple molding tools.

Figure 2:
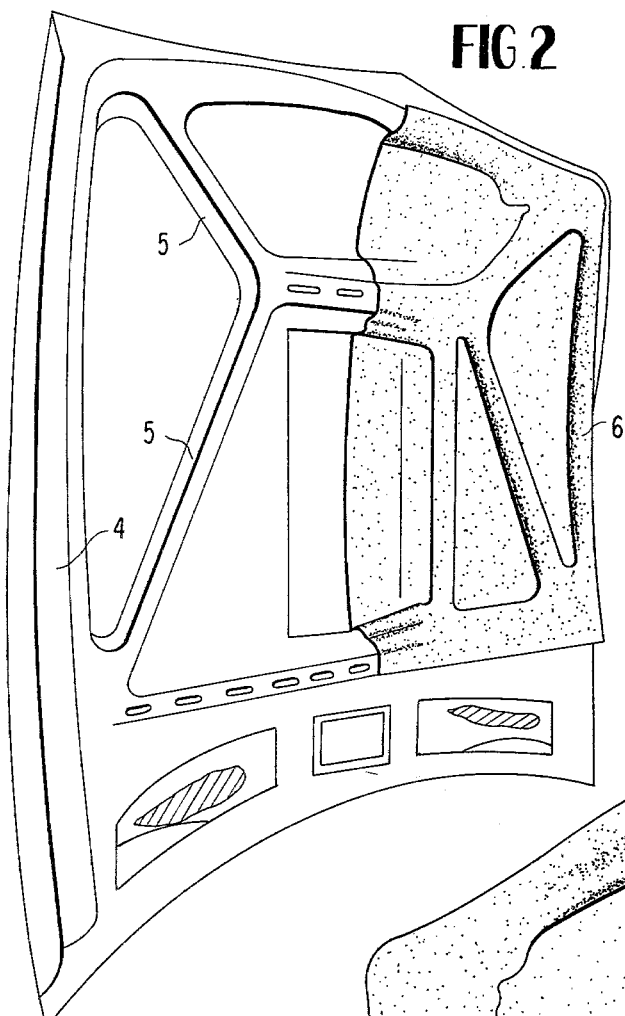
FIG. 2 shows a top view of the inside of an engine hood with a partial engine hood lining.

FIG. 2 illustrates an engine hood 4 in a top view from the inside, wherein the large engine hood panel is reinforced by struts 5. This inside of the engine hood 4 is now lined with the lining 6, fashioned in accordance with this invention, which can have the laminated structure shown in FIG. 1 and is made of one piece. FIG. 2 shows only a portion of the lining 6, so that the structure of the engine hood can also be illustrated. Because of the struts 5 of the inside of the engine hood 4, undercut spaces are formed during the molding process which are advantageously suitable for mounting the lining in these undercut locations. For this purpose, the engine hood lining of the present invention is constructed so that it is shaped, by a molding step, to the inner contour of the engine hood, and, in a second molding step, undercuts i.e. depressions or grooves are pressed into the still hot, contoured lining.

Figure 3:
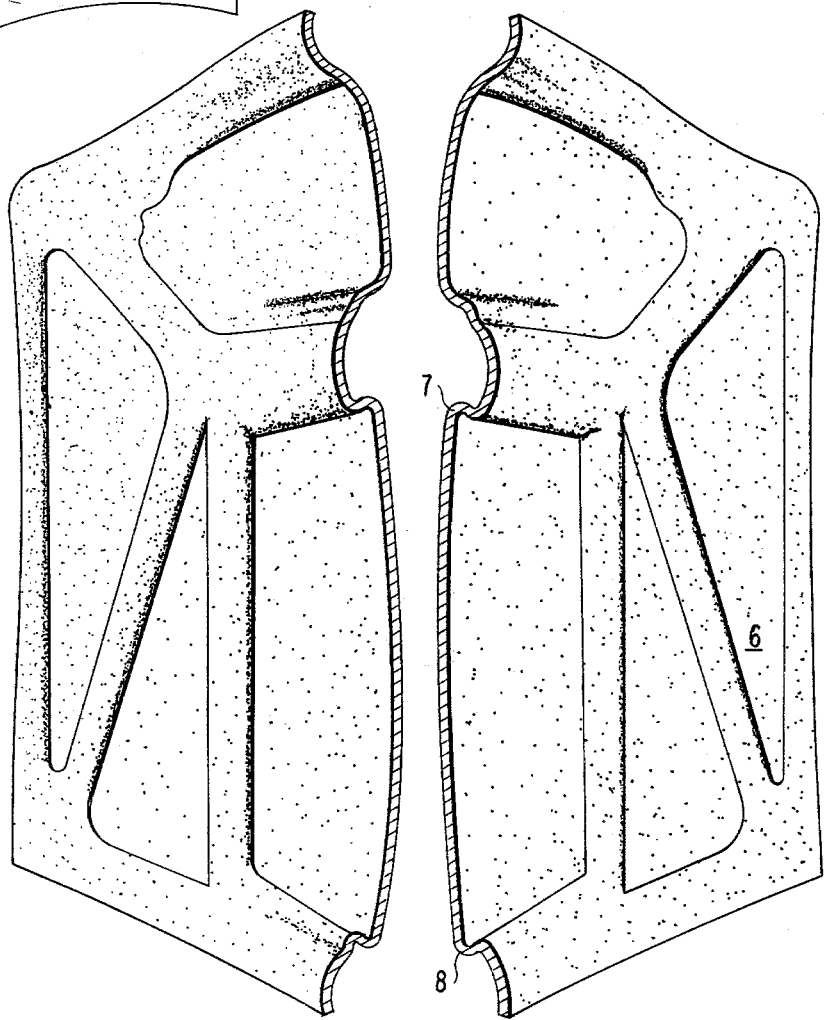
FIG. 3 is a topview, partially in perspective, of a cut-through engine hood lining.

The structure of the engine hood lining with the undercuts is shown in the perspective sectional view of FIG. 3, where the lining 6 is formed additionally with projecting beads 7, 8 in the zone of the struts of the engine hood. Due to the elasticity of the material, the thus-formed beads 7, 8 of the lining serve as clamping beads permitting a rapid assembly of the lining by placing the beads 7, 8 on the struts 5 and by then mounting them with a snap connection, i.e. with pressure.

The following examples will further explain the invention:

EXAMPLE 1

A closed-cell, partially cross-linked polyethylene foam panel having a weight per unit volume of 30 kg./m$^3$ and a thickness of 15 mm., produced from high-pressure polyethylene with 1% by weight of dicumyl peroxide as the cross-linking agent and 15.1% by weight of azodicarbonamide as the blowing agent is shaped by stamping as a planar engine hood lining which is glued into the engine hood by means of an adhesive, e.g. a solution adhesive on petroleum ether basis, such as TEROSON AKL 401000 3868(Trademark).

EXAMPLE 2

A polyethylene foam panel as described in Example 1 is heated in a circulating-air furnace to a temperature of 120°–150° C. and then molded in a mold consisting of a female part and a male part. In this connection, the male part is formed like a basket, the steel rods being arranged so that they exert the necessary molding pressure on the heated foam panel only at the places to be deformed or shaped. In contrast thereto, the female mold part consists of a glass-fiber-reinforced mold which can be cooled. In the basket of the male mold, slides are arranged which are operated pneumatically, hydraulically, or mechanically and mold the undercuts into the engine hood lining. It will be understood that the slides are actuated only once the male mold part is seated on the female mold part, and the foam panel has been molded.

EXAMPLE 3

A closed-cell, partially cross-linked polyethylene foam panel having a weight per unit volume of 30 kg./m$^3$ and a thickness of 10 mm., produced from high-pressure polyethylene with 1% by weight of dicumyl peroxide as the cross-linking agent and 15.1% by weight of azodicarbonamide as the blowing agent, is flame-laminated with a polyethylene foam panel having a weight per unit volume of 70 kg./m$^3$ and a thickness of 5 mm., prepared from 35% by weight of high-pressure polyethylene and 65% by weight of low-pressure polyethylene with 1% by weight of dicumyl peroxide as the cross-linking agent and 7.4% by weight of azodicarbonamide as the blowing agent; thereafter, the composite panel is molded in accordance with Example 2. The lamination with the panel containing low-pressure polyethylene imparts to the molded article a higher temperature stability.

EXAMPLE 4

A polyethylene foam panel as described in Example 2 is additionally laminated with a heavyweight sheet having a thickness of 2 mm. and being made of 85% by weight of heavy spar (barium sulfate) and 15% by weight of an ethylene-vinyl acetate copolymer with 45% by weight of vinyl acetate, and then molded in accordance with Example 2. The lamination with the heavyweight sheet provides an improved noise-attenuating effect.

A pressure mold as described in U.S. Pat. No. 3,635,629 can be utilized, for example in order to manufacture the engine hood lining in accordance with this invention.

Suitable non-foamed polymer sheets in addition to an ethylenevinyl acetate copolymer sheet filled with heavy spar (baryte) also include bitumen-containing synthetic resin sheets, for example on the basis of EPDM (ethylene-propylene-diene monomers), polyethylene, PVAC (polyvinyl acetate), etc. or bituminous sheets filled with fillers.

Suitable color pigments are those heretofore conventionally utilized in the dyeing or coloring of synthetic resins, i.e., organic as well as inorganic color pigments and pigment compositions.

Suitable molding and forming processes which are conventional and which can be used to produce the hood lining of this invention are described in Kunststoff-Taschenbuch [Plastics Handbook] 18th Edition, Carl Hanser Publishers, Munich 1971.

What is claimed is:

1. An engine hood lining for an automotive vehicle which comprises a contoured, one-piece, molded composite panel adapted to cover struts extending across the inside portion of a hood of an automotive vehicle, said composite panel consisting of a closed-cell polyethylene foam material laminated on at least one side with a non-foamed polymer sheet and being shaped by molding to have a contour that fits the inside contour of the hood of the vehicle, said non-foamed polymer sheet being a heavy-weight sheet containing a mineral filler, said non-foamed polymer being a copolymer of ethylene and vinyl acetate containing 50–90% by weight of barium sulfate as the filler.

* * * * *